June 3, 1924.
L. A. DUHAMEL
1,496,306
CIRCUIT CLOSING DEVICE FOR OIL LEVEL INDICATORS
Filed Feb. 26, 1921
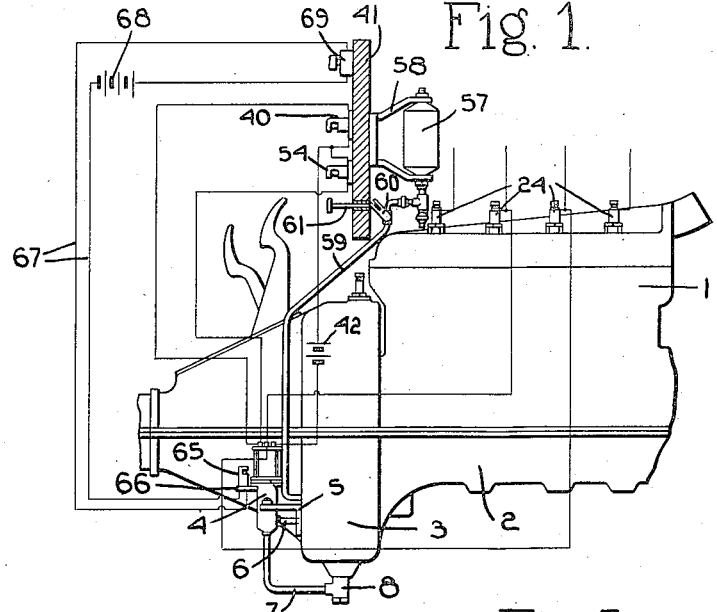
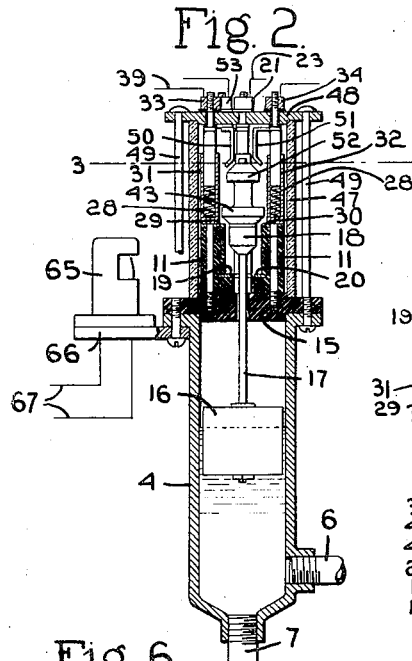
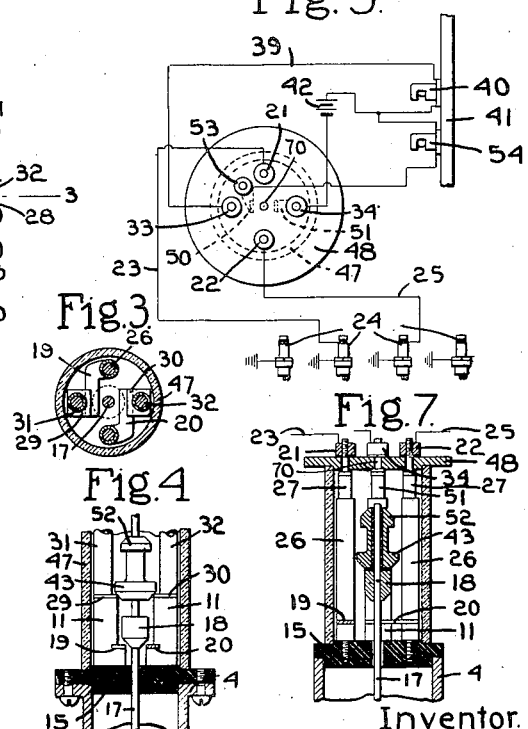
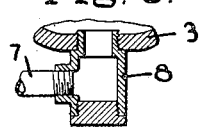
Inventor.
Louis A. Duhamel
by Heard Smith & Tennant.
Attys.

Patented June 3, 1924.

1,496,306

UNITED STATES PATENT OFFICE.

LOUIS A. DUHAMEL, OF WOONSOCKET, RHODE ISLAND.

CIRCUIT-CLOSING DEVICE FOR OIL-LEVEL INDICATORS.

Application filed February 26, 1921. Serial No. 448,030.

*To all whom it may concern:*

Be it known that I, LOUIS A. DUHAMEL, a citizen of the United States, and resident of Woonsocket, county of Providence, State of Rhode Island, have invented an Improvement in Circuit-Closing Devices for Oil-Level Indicators, of which the following description, in connection with the accompanying drawing, is a specification, like characters on the drawing representing like parts.

This invention relates to oil level indicators that are specially adapted for use in connection with internal combustion engines to indicate the level of the oil in the crank case. Such devices are arranged to give a warning signal when the oil level reaches a predetermined low point and the object of my present invention is to provide a novel circuit-closing device for an oil level indicator which will close a circuit to give a preliminary warning when the oil reaches one predetermined low level and which will close another circuit by which the ignition system of the engine is short circuited when the oil reaches a further low level at which it would be dangerous to continue running the engine.

The circuit-closing device is also arranged to close a third circuit when the oil is at the high level or the crank case is full thus giving a "full" signal. With my invention, therefore, the driver of the automobile will be given a warning when the oil level reaches a point at which it should be replenished and if he fails to heed the warning and continues to run the engine till the oil reaches the danger point then the engine will be rendered ineffective by the short circuiting of the ignition circuit.

In order to give an understanding of my invention I have illustrated in the drawings a selected embodiment thereof which will now be described after which the novel features will be pointed out in the appended claims.

Fig. 1 is a side view of a portion of an engine of an automobile having my improved signal and gage applied thereto.

Fig. 2 is an enlarged vertical section through the oil gage.

Fig. 3 is a section on the line 3—3, Fig. 2.

Fig. 4 is a sectional view showing the position of the parts when the oil is at the low level.

Fig. 5 is a top plan view of the oil gage showing the wiring connections.

Fig. 6 is an enlarged view showing the oil connection at the bottom of the gage.

Fig. 7 is a vertical sectional view through the circuit-closing device taken at right angles to Fig. 2.

1 indicates somewhat diagrammatically a four cylinder automobile engine which is provided with the crank case 2 and the chamber or portion 3 in which the fly wheel operates.

4 indicates a float chamber which is connected to the crank case by the pipes 6 and 7, the pipe 7 leading to the lower end of the crank case and the pipe 6 leading into the side of the crank case. With this connection the oil level in the float chamber will always be the same as that in the portion 3 of the crank case. The pipe 7 is connected to the crank case in any suitable way as by means of a connection 8. This float chamber is supported on a bracket 5 that is secured to the float chamber.

The float chamber is closed at its upper end by means of a cap 15 and operating in the float chamber 4 is a float 16 having a stem 17 which extends through the cap 15. The portion of the stem above the cap 15 is provided with means for closing different circuits as the float rises or falls. One of these circuits lights a signal light on the dash or instrument board to indicate when the oil level approaches its low point and another circuit short circuits one or more of the spark plugs when the oil reaches the danger point. For thus closing these different circuits the stem 17 is provided with bridging contacts. The bridging contact which closes the circuit that short circuits or grounds the spark plugs is indicated at 18 and is fast on the stem 17 above the cap 15. On the upper side of the cap 15 are two contacts 19 and 20 which are supported by suitable insulating blocks 11 and are situated on opposite sides of the stem 17, said contacts being placed somewhat below the bridging contact 18 when the float is in its elevated position as seen in Fig. 2. When, however, the oil is low in the crank case so that it is dangerous to continue operating the engine then the float will have descended to a point which will bring the contact 18 against the contacts 19 and 20, the contact 18 at this time bridging the contacts 19 and 20.

24 indicates the spark plugs of the engine and the contact 19 is connected to one spark plug and the contact 20 to another spark plug so that when the bridging contact 18 bridges the two contacts 19 and 20 these two spark plugs will be connected together thus causing them to misfire and be ineffective.

Any suitable way of connecting the contacts 19 and 20 to the spark plugs may be employed without departing from the invention. These various contacts are shown as enclosed in a glass casing 47 which is provided with a cap 48, said cap being connected to the float chamber by tie rods 49. The contact 19 is connected to a binding post 21 carried by the cap 48 and the contact 20 is connected to a binding post 22 carried by said cap, and the binding posts 21 and 22 are connected to two different spark plugs by wire connections 23 and 25 respectively as seen best in Fig. 5. The connection between each contact 19 and 20 and its binding post 21 and 22 is preferably a yielding one and comprises a cylindrical member 26 connected to each contact 19 and 20 and another member 27 received within the tubular member and directly connected to the binding post. A spring 28 in each tubular member provides for the yielding connection. With this construction the spark plugs will function in their usual manner so long as there is sufficient oil in the crank case but when the oil gets to such a low point that it is dangerous to continue running the car, then the bridging contact 18 will bridge the contacts 19 and 20 thus connecting two of the spark plugs together and rendering them useless. Under these conditions the engine will continue to run on two cylinders but will be ineffective for ordinary use.

As stated above my invention also is arranged to close a circuit thereby giving a signal when the oil in the crank case begins to get low and reaches a point when it should be replenished, such circuit being closed before the oil level has reached such a low point that the bridging contact 18 will bridge the contacts 19 and 20. For this purpose the insulating blocks 11 are each provided at their upper ends with contacts, said contacts being indicated at 29 and 30 respectively. These contacts are connected by connections 31 and 32 with binding posts 33, 34 on the cap 48 and the binding posts are connected to a lamp circuit 39 including a signal light 40 which may be placed on the dash 41 and also including a battery 42. Slidably mounted on the stem 17, but insulated therefrom, is a bridging contact 43. When the float chamber is filled with oil and the float is in lifted position this bridging contact 43 is supported by the contact 18, as shown in Fig. 2 and is also situated above the contacts 29 and 30. When the oil in the crank case reaches a level at which it should be replenished but before it has reached a sufficiently low point for the spark plugs to be short circuited, the bridging contact 43 will be brought against the contacts 29 and 30, thus closing the circuit 39 and lighting the signal lamp 40. If oil is not supplied to the crank case at this time and the oil level continues to be lowered then the float 16 and stem 17 will move downwardly but will leave the bridging contact 43 resting on the contacts 29 and 30, as shown in Fig. 4. The signal light 40 will continue to be lighted so long as the oil in crank case is below the point at which it should be replenished. When oil is added to the crank case to raise the float 16 into the position shown in Fig. 2 then the lamp circuit 39 will be opened and the signal will be extinguished.

My improved circuit closure is also provided with means to close a circuit when the crank case is filled with oil and which will give a signal or indication that the crank case is full. For this purpose I have provided two contacts 50 and 51 on the under side of the cap 48, and have provided the contact 43 with a portion 52 to bridge the contacts 50 and 51 when the float is at its high point. The contact 51 is connected directly to the binding post 34 and the contact 50 is connected to a separate binding post 53. This binding post 53 is connected to a signal light 54 which may be arranged on the dash 41 and which is also connected to the battery 42 as shown in Fig. 5. When, therefore, there is sufficient oil in the float chamber to raise the float to a point slightly higher than that shown in Fig. 2 then the contacts 52 will bridge the contacts 50 and 51 and close the circuit through the signal light 54.

57 indicates a reserve tank or can for containing a reserve supply of oil and which is shown as supported on the dash 41 by suitable brackets 58. This oil tank is connected by a pipe 59 to the crank case and the pipe 59 has a valve 60 therein which can be operated by an actuator 61 that extends through the dash and is in convenient reach of the operator. I will preferably make the reserve tank 57 of a capacity to hold one or two quarts of oil so that whenever the oil in the crank case reaches a sufficiently low level so that the signal light 40 is lit, the operator may open the valve 60 by the actuator 61 and allow the entire contents of the tank 57 to run into the crank case. An automobile engine will always take one or two quarts of oil when the oil gets low without becoming overloaded with oil.

This reserve tank 57 provides a guarantee against injuring the engine because of lack of oil, for whenever the oil reaches the low point the signal light 40 will be lighted and if the operator then opens the valve 60 he may replenish the crank case with oil without stopping the engine or leaving his seat. If, however, he neglects to do so then before the oil becomes sufficiently exhausted so that there is danger of burning out the bearings the contact 18 will bridge the contacts 19 and 20 thus connecting together two of the spark plugs and causing the engine to run on two cylinders. This renders the engine ineffective for any ordinary use without however entirely "killing" the engine.

If the oil in the crank case is replenished when the engine is idle so that the oil may find its true level without being splashed about by the motion of the engine, then the signal light 54 will give an indication when the crank case is sufficiently full.

65 indicates an electric light which is supported on a bracket 66 secured to the float chamber, this electric light being situated so as to illuminate the glass casing 47. The position of the contacts 18 and 43 indicate the position of the float and this is determined by the oil level, therefore the lamp 65 provides sufficient light so that a person can see just how much oil he has at night. This lamp 65 is in a circuit 67 containing a battery 68 and controlled by a switch 69 on the dash 41.

The cap 48 will preferably have an opening 70 therein so that a wire or pin may be inserted through the opening to depress the float far enough to bring the contacts 43 and 18 into position to bridge the contacts 29 and 30 and 19 and 20. The purpose of this is so that the operator may test the device at any time to see if it is working properly.

I claim:

1. In an oil gage and signal for internal combustion engines, the combination with a float chamber connected to the crank case of the engine, of a float in said chamber, a contact-receiving chamber above the float chamber and separated therefrom by a partition of insulating material, three pairs of contacts in the contact-receiving chamber, said pairs of contacts being spaced from each other vertically, a stem connected to the float and extending through said partition into the contact-receiving chamber, a bridging contact rigid with the stem and adapted to engage the lowest pair of contacts, a sleeve slidably mounted on the stem and having at its lower end a bridging contact adapted to engage the intermediate pair of contacts, said contacts being arranged so that as the float descends they close the pairs of contacts successively, and a third bridging contact at the upper end of the sleeve and adapted to bridge the remaining pair of contacts when the float is at the upper limit of its movement.

2. In a device of the class described, the combination with a float chamber having a float therein, of a contact-receiving chamber above the float chamber and separated therefrom, three pairs of contacts in the contact-receiving chamber, said pairs of contacts being spaced from each other vertically, a stem connected to the float and extending into the contact-receiving chamber, a bridging contact rigid with the stem and adapted to engage the lowest pair of contacts when the float reaches the lower limit of its movement, a sleeve slidably mounted on the stem above said bridging contact, said sleeve having at its lower end a bridging contact adapted to rest on and engage the intermediate pair of contacts as the float descends, said sleeve also having a third bridging contact at its upper end adapted to engage the uppermost pair of contacts when the float is at the upper limit of its movement, the construction being such that as the float descends the bridging contact at the lower end of the sleeve will first bridge the intermediate pair of contacts and subsequently the bridging contact which is fixed with the stem will bridge the lower pair of contacts.

In testimony whereof, I have signed my name to this specification.

LOUIS A. DUHAMEL.